(12) United States Patent
Hulls et al.

(10) Patent No.: US 7,043,879 B2
(45) Date of Patent: May 16, 2006

(54) FORCE-RESISTING DEVICES AND METHODS FOR STRUCTURES

(75) Inventors: John Hulls, Point Reyes, CA (US); Rory R. Davis, Gardnerville, NV (US)

(73) Assignee: Ei-Land Corporation, San Francisco, CA (US)

( * ) Notice: Subject to any disclaimer, the term of this patent is extended or adjusted under 35 U.S.C. 154(b) by 0 days.

(21) Appl. No.: 10/074,684

(22) Filed: Feb. 11, 2002

(65) Prior Publication Data

US 2003/0150173 A1  Aug. 14, 2003

(51) Int. Cl.
  *E04B 2/70* (2006.01)
(52) U.S. Cl. .............................. 52/1; 52/293.3; 52/295; 52/167.3; 52/167.8
(58) Field of Classification Search ...................... 52/1, 52/291, 295, 167.1, 167.7, 167.8, 167.3, 52/293.3
See application file for complete search history.

(56) References Cited

U.S. PATENT DOCUMENTS

| | | |
|---|---|---|
| 2,146,333 A | 2/1939 | Deming |
| 4,094,111 A | 6/1978 | Creegan |
| 5,177,915 A | 1/1993 | Kobori et al. |
| 5,595,040 A | 1/1997 | Chen |
| 5,628,156 A | 5/1997 | Tarics |
| 5,660,017 A | 8/1997 | Houghton |
| 5,680,738 A | 10/1997 | Allen et al. |
| 5,706,626 A * | 1/1998 | Mueller ................... 52/800.12 |
| 5,904,025 A * | 5/1999 | Bass et al. ................. 52/741.3 |
| 5,927,019 A * | 7/1999 | Ichida ......................... 49/501 |
| 6,006,487 A * | 12/1999 | Leek ............................ 52/698 |
| 6,112,799 A | 9/2000 | Mullet et al. |
| 6,148,583 A | 11/2000 | Hardy |
| 6,170,202 B1 | 1/2001 | Davoodi et al. |
| 6,212,849 B1 * | 4/2001 | Pellock ......................... 52/693 |
| 6,233,884 B1 | 5/2001 | Tipping et al. |
| 6,237,303 B1 | 5/2001 | Allen et al. |
| 6,293,063 B1 | 9/2001 | Van Doren |
| 6,308,469 B1 | 10/2001 | Leung |
| 6,327,825 B1 | 12/2001 | Sanders et al. |
| 6,389,767 B1 * | 5/2002 | Lucey et al. .................. 52/295 |
| 6,412,237 B1 * | 7/2002 | Sahai ......................... 52/167.1 |
| 6,438,905 B1 | 8/2002 | Constantinou |
| 6,481,175 B1 | 11/2002 | Potter et al. |
| 6,560,940 B1 * | 5/2003 | Mueller ........................ 52/295 |
| 6,761,001 B1 * | 7/2004 | Mueller ..................... 52/167.3 |

(Continued)

OTHER PUBLICATIONS

Smith, Peter R., "DESC 1004 Building Principles", University of Sydney, 8 pages (Sep. 2, 2000).

(Continued)

Primary Examiner—Basil Katcheves
(74) Attorney, Agent, or Firm—Buchanan Ingersoll PC

(57) ABSTRACT

In accordance with the present invention there is provided a force-resisting device for transmitting forces and dissipating and absorbing energy across a discontinuous structural element of a structure. The device includes at least one active element, the active element having defined force versus deflection properties and able to transmit force and dissipate and absorb energy, one end of the active element configured to be connected to a structure, and at least one frame element disposed about a discontinuous structural element, wherein the frame is configured to be connected to a second end of the active element, wherein the active element and the frame element configured to resist forces applied to the structure by transmitting forces across the discontinuous structural element.

74 Claims, 9 Drawing Sheets

U.S. PATENT DOCUMENTS

2001/0002529 A1  6/2001  Commins et al.
2002/0020122 A1  2/2002  Mueller
2002/0162284 A1  11/2002  Karalic
2002/0162285 A1  11/2002  Sahai

OTHER PUBLICATIONS

Davis, Gil, "Steel moment-frame buildings", Strcutural Engineer, pp. 28-35 (Jun. 2001).

Utterback, David, "Common Engineering Problems in Fram Construction", http://www.taunton.com/pages/h00011.asp, The Taunton Press, 6 pages (Apr. 3, 2002).

Simpson Strong-Tie Co., Inc., "Wood Construction Connectors," Catalog C-2002 Front Cover and p. 31.

"Details, Dimensions and How to do it!," Installation Manual, Simplified Structural Systems, Copyright 2000.

* cited by examiner

FORCE-RESISTING DEVICES AND METHODS FOR STRUCTURES

1. FIELD OF THE INVENTION

The present invention relates to devices and methods for transmitting forces and dissipating and absorbing energy across discontinuous structural elements. More particularly, the present invention relates to a force-resisting device for transmitting forces and dissipating and absorbing energy. The device includes at least one active element; the active element configured to effect the transmission, dissipation, and absorption functions by means of controlled deformation.

2. BACKGROUND OF THE INVENTION

Building structures must be designed to safely withstand forces that may be applied thereto. As construction techniques improve, buildings are more capable of resisting loads that are applied thereto. Examples of loads that may be applied to buildings are those that result from earthquakes and windstorms. These forces may resolve within a structure as tension, compression, shear, torsion, or bending forces. Of the forces produced by such events on a building, horizontal (or shear) loads are significant. These horizontal forces attempt to shear (slide) the building off its foundation. Additionally, horizontal forces that develop in an upper story of a multiple story structure are transmitted to the lowest story primarily as in-plane shear loads on the lower story walls. In conjunction with shear forces, "uplift" or "overturning" forces also result on the structure. These uplift/overturning forces, generated in reaction to the moment of the shear force, attempt to lift and rotate the walls of the structure about a lower corner of the wall. In fabricating the structure, the structure must be designed with sufficient "shear resistance" so that the structure does not sustain excessive non-structural and/or structural damage or collapse due to applied forces, potentially resulting in extensive economic cost, serious injury or loss of life. Shear resistance can be further defined as the ability of a structure to absorb, dissipate, and transfer forces. To address the need to build a structure having sufficient strength, uniform building codes ("UBC's") provide required building practices wherein the prescribed goal is life safety, but not necessarily to retain the building as habitable after a natural disaster.

Damage caused by forces resulting from seismic and hurricane events has exposed the need for improved force-resisting structures and/or structural elements for both new building structures and for retrofit into existing building structures.

Prior to the creation of the UBC's, early buildings were constructed having little or no capability to resist shear forces, uplift from foundations, and other loads. Walls of the structure were generally constructed only of vertical frame members with horizontal planks nailed across them. Later improvements included the use of diagonal wood braces, or diagonal sub-planking in the walls, with either shingles or some other outer layer to exclude weather and provide a finished exterior. However, as understanding of building performance in earthquakes and hurricanes continues to improve, the necessity for better structural properties has become more apparent and is being mandated by the UBC.

In general construction, the most common way of producing a shear wall is to use plywood sheathing attached to a plurality of vertical 2×4 or 2×6 inch wooden or metal framing members. The plywood sheathing is attached to the framing members with closely spaced nails/screws on the edges of the plywood panel. The use of the plywood sheathing and specified fastening patterns that are incorporated into all modern building codes has proven to be a very successful method of producing a wall having shear resistance. Analysis of damage caused in recent earthquakes, such as the 1994 Northridge earthquake in California, illustrated that in some cases, buildings built to the standards specified in the California UBC survived rather well. However, there were a substantial number of structural failures generally associated with openings formed in shear walls and stress concentrations on steel-frame building connections. Although, a building may remain standing after an earthquake, it still may be rendered uninhabitable due to non-structural and/or structural damage.

Problems caused by openings are twofold: stiffness reduction and stress concentrations. First, openings dramatically reduce the shear stiffness of the wall. For example, even comparatively small window openings will reduce the shear stiffness sufficiently that the wall can no longer be considered a continuous shear wall, thereby increasing the effective aspect ratio of the wall, wherein the aspect ratio is defined as the ratio of the height of the wall H to the width of the wall W. When the aspect ratio of the wall is increased, the overturning forces on the wall for the constant overturning moment (where the moment is determined by story height and shear force only) become higher and more localized.

Referring now to FIG. 1, there is illustrated an exemplary embodiment of an isolated shear wall 10 illustrating the balance of forces applied thereto. The force F is the shear force carried by the shear wall at the top edge due to a loading event such as an earthquake. The force must be reacted in shear at the foundation, shown by the opposing force F at the bottom. The moment of F relative to the foundation, equal to F multiplied by the story height H, must be reacted by foundation vertical or overturning forces A1, A2 (shown as discrete, but may be distributed near the corners). The force A2 is particularly troublesome, as it is tensile against the foundation, and is equal to (H/W)×F. In a case where there are adjacent additional structures, some of the overturning moment may be carried by shear on the sides of the shear wall 10, but eventually the entire overturning moment must be reacted at the foundation by vertical forces, and those forces are proportional to the panel aspect ratio H/W.

Referring now to FIG. 2A, there is shown an exemplary embodiment of a shear wall 10 wherein an opening O has been formed within the shear wall. As shown in FIG. 2A, the opening creates a discontinuity in the force transmitting characteristics of the shear wall, wherein forces that are normally carried across the entire wall width W now must be carried across the reduced width W'. The reduced width is less stiff and less strong, and the opening corners also introduce panel stress concentrations that did not previously exist. The corners A tend to crack open, and the corners B tend to crush and buckle closed, under the direction of force F' shown, as FIG. 2B shows. Therefore, the load carrying stiffness and overall strength of this shear wall is substantially reduced. In addition, if adjacent structures exist, they will be caused to carry more forces because this panel is less stiff and as a result takes up a smaller proportion of the forces.

To address the weakness created in shear walls due to openings formed therein, there have been recent changes in the UBC. The recent changes to the UBC have halved the maximum aspect ratio of shear walls and shear wall segments so that the minimum width of an 8 ft high shear wall has been increased from 2 ft. to 4 ft, for a maximum aspect ratio of two.

Another problematic variable in the construction of a building is the variations in construction quality, foundation quality, and soil variability. Following the 1994 Northridge earthquake, it was discovered that a large percentage of building failures occurred as a result of poor field construction practice. One study indicated that one third of the seismic safety items installed were missing and/or improperly installed or poorly implemented in over 40% of the structures surveyed.

Further still, it is important that structural elements within the building structure have generally similar strength and stiffness properties in order to share the applied loads. If every structural element does not work together, this may lead to excessive damage or failure of a structural element due to force over-loading of the structural element, as opposed to load sharing. There may be locations within a building structure wherein walls having different stiffness/strength are joined together. For example, a structure may be built with a concrete retaining wall, wherein timber-framed shear walls may be joined to the poured concrete retaining wall. Many times, during seismic events the connection point of the two walls having different stiffness will separate due to the difference in stiffness of the walls in relation to the movement of the wall in response to the seismic event. In addition, irregular placement of structural elements with varying stiffness/strength characteristics can result in twisting of the structure leading to additional torsional stresses and other stress amplifications. Thus, there is a need for a device that will transmit forces and dissipate and absorb energy across discontinuous structural elements.

In addition to that above, another aspect to be considered is the manner in which the UBC is interpreted by local building inspectors. Often, building inspectors will make highly restrictive interpretations of the building codes in an effort to promote increased safety in building practices.

There have been numerous attempts to address increasing the shear resistance of a structure where the structure includes a number of discontinuities/openings formed in shear wall(s). One of the most common methods of addressing the need to increase the shear resistance of a structure has been to include a moment frame in the design of the structure, whereby steel beams are rigidly connected together such that any force applied to the structure will be carried through the moment frame. A moment frame is typically embodied as a large heavy steel structure designed to transmit shear forces of the structure into the foundation or into special footings formed in the foundation, via bending (or moment) resistance of large steel members. However, a moment frame must be specifically engineered for each application, thus adding significant cost and complexity to the structure. In residential construction, even a modest opening in a shear wall can require 6" or 8" steel girders weighing hundreds of pounds and the attendant foundation reinforcement required to absorb the loads transmitted thereto by the moment frame. The architect/builder must also account for shipping and handling costs associated with the installation of these heavy steel beams on the building site. Further still, the use of a moment frame causes significant problems with the insulating properties of the building, as the metal beams act to conduct heat through the walls of the structure to the interior of the structure, thus causing degradation of insulation properties.

Although moment frames appear to be a solution, albeit inefficient, to increase the shear resistance of a structure, there are still shortcomings of the popular field welded-field bolted beam-to-column moment frame connection. Observation of damage sustained in buildings during the 1994 Northridge earthquake showed that, at many sites, brittle fractures occurred within the connections at very low levels of loading, even while the structure itself remained essentially elastic (Federal Emergency Management Administration Report 350). This type of connection is now not to be used in the construction of new seismic moment frames. For example, tests conducted by the Seismic Structural Design Associates, Inc. (SSDA) have shown large stress and strain gradients in moment frame joints/connections that exacerbate fracture. To address these large concentrations of stress in the corners, there has been much work attempting to improve the ability of the corners of a moment frame to resist loads. One such improvement to a corner connection is embodied in U.S. Pat. No. 6,237,303.

Another approach to structural reinforcement is to utilize a pre-built shear wall such as the Simpson StrongWall®. The StrongWall® is a pre-built shear wall that may be integrated into a building structure. The StrongWall® is constructed of standard framing materials and metal connectors. The StrongWall® further includes a plurality of devices configured to anchor the StrongWall® to a building foundation. The StrongWall® must be connected to the framing of the structure as well as to the foundation. Because the StrongWall® must be connected to the structure's foundation, this requires special work on the foundation prior to installation, thus rendering retrofit application of the StrongWall® not cost effective. In addition, the StrongWall® is delivered to a job site as a pre-built panel, thus the architect/builder must account for shipping and handling costs associated with the installation of these heavy panels on the building site.

Shortcomings of both moment frames and StrongWalls® are that both devices do not attempt to match the shear stiffness and strength characteristics of the surrounding structure. Instead, each device is designed without regard for the structure it will be used within, and is generally designed to carry the entire shear load of a wall or wall segment. As described above, a moment frame is typically constructed of steel beams, wherein the beams are rigidly connected together such that any force applied to the structure will be carried through the moment frame and into the foundation. The StrongWall® is designed in a similar manner, wherein the StrongWall® attempts to be stronger than the surrounding structure. Moment frames and larger StrongWalls®, due to their size and weight, can be difficult to move around the job site and install without the use of costly heavy equipment. Both the moment frame and the StrongWall® significantly increase the overall cost of the structure. Therefore there is a need for a lightweight device that may be installed within or about openings of a structure to maintain the properties of that structure as a generally continuous element.

While the two devices described above may be readily utilized in new construction there is still a need for devices that may be utilized during structural retrofits, seismic or hurricane upgrades, and/or remodels. For example, a homeowner may cut an opening in a shear wall to place a new window or doorway. Many times, these home retrofits are done without any consideration to shear strength of the wall or obtaining a permit. Thus, when the homeowner wishes to sell their house that includes these "improvements", many times their homes will not meet code and cannot be sold as is. What is therefore needed is a device that can be readily adapted to retrofits to maintain the properties of the structure as a generally continuous element after an opening has been formed in the shear wall. There is also a need for an easily manufactured, lighter, less complicated, more versatile, adjustable, easier to install device for new construction.

SUMMARY OF THE INVENTION

The purpose of the present invention is to provide devices and methods for structurally reinforcing a building element such as a shear wall, while eliminating the high cost, complexity, weight and handling problems of the prior art, while further allowing a builder and/or architect to consider the entire wall as a generally continuous shear wall, and to allow a structure to be designed without having to consider any of the discontinuity problems previously described. A further purpose is to eliminate the need to repeatedly engineer solutions specific to particular shear-resisting elements, openings and discontinuities in specific buildings, and to allow the safe installation of windows and doors in existing buildings without the need for extensive design, structural reinforcement or engineered modifications.

To accomplish these purposes there is provided a force-resisting device for transmitting forces and dissipating and absorbing energy across a discontinuous structural element of a structure. The device includes at least one active element, the active element having defined force versus deflection properties, wherein the active element is configured to provide a load path across a discontinuous structural element.

In one embodiment there is provided another force-resisting device for transmitting forces and dissipating and absorbing energy across a discontinuous structural element of a structure, the device including at least one active element having at least a first end and a second end, the active element having defined force versus deflection properties and configured to transmit force and dissipate and absorb energy, wherein the first end of the active element is configured to be connected to a structure; and at least one frame element disposed about a discontinuous structural element, wherein the frame element is configured to be connected to the second end of the active element, the active element and the frame element configured to resist forces and reduce stresses and replace stiffness, dissipation, and strength to the structure.

In a further embodiment there is provided yet another force-resisting device for transmitting forces and dissipating and absorbing energy across a discontinuous structural element of a structure, the device including at least one active element having at least a first end and a second end, the active element having defined force versus deflection properties and configured to transmit force and dissipate and absorb energy, wherein the first end of the active element is configured to be connected to a structure. The force-resisting device further includes at least one frame element configured to be connected to a discontinuous structural element, the frame element is configured to be connected to the second end of the active element, wherein the active element and the frame element configured to resist forces applied to the structure by transmitting forces across the discontinuous structural element.

In a further embodiment there is provided yet another force-resisting device for transmitting forces and dissipating and absorbing energy across a discontinuous structural element of a structure, the device including at least one active element having at least a first end and a second end, the active element having defined force versus deflection properties and configured to transmit force and dissipate and absorb energy, wherein the first end of the active element is configured to be connected to a structure, and at least one reinforcement element, the reinforcement element configured to be connected to a structure. The force-resisting device further includes at least one frame element configured to be disposed about a discontinuous structural element, wherein the frame element is configured to be connected to the second end of the active element, the active element, the frame element, and the reinforcement element configured to resist forces applied to the structure by transmitting forces across the discontinuous structural element and further configured to reduce stresses and replace stiffness, dissipation, and strength to the structure.

In still another embodiment there is provided a method of restoring the stiffness, energy dissipation capacity, and strength of a structure containing a discontinuous structural element, the method including the step of: transmitting forces across the discontinuous structural element, thereby providing load sharing across the discontinuity.

In a further embodiment there is provided a method for selecting a force-resisting device, the device configured to transmit loads and to dissipate and absorb energy, the method including the steps of; selecting a structural element to be reinforced; selecting a design configuration of a force-resisting device containing at least one active element; selecting a design configuration for the active element; building a computer generated finite element model of the force-resisting device with at least one degree of freedom for transmitting force and dissipating and absorbing energy; and using the computer generated finite element model in a finite element analysis program to iterate the design of the active element to produce defined force versus deflection properties.

DETAILED DESCRIPTION OF THE DRAWINGS

Features and advantages will become apparent from the following and more particular description of the preferred embodiments of the invention, as illustrated in the accompanying drawings, and in which like reference numerals generally refer to the same parts or elements through-out the view, and in which.

Figure 12:
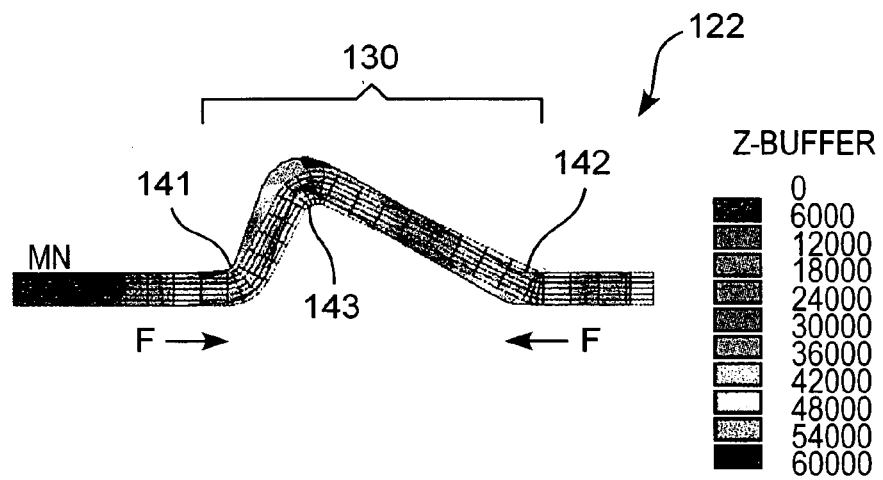
Figure 13:
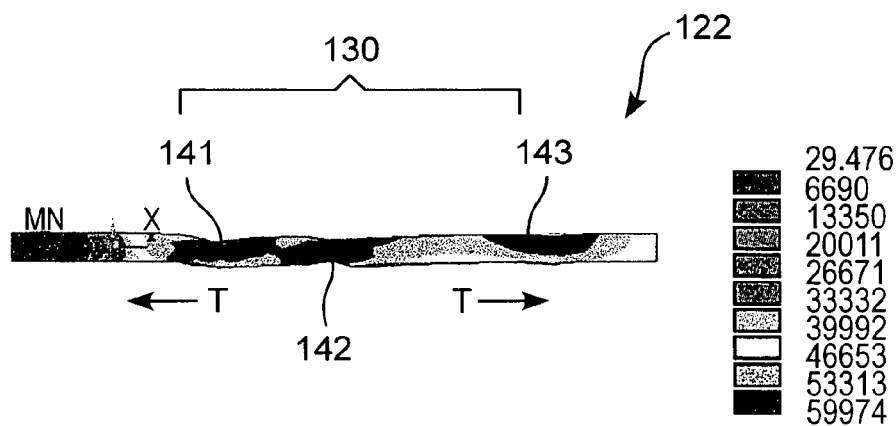

FIG. 12 is a true scale deformation and color coded stress display of a computer simulation of an exemplary embodiment of a force-resisting member of the force-resisting device including the active element undergoing progressively plastic compression due to an applied force; and FIG. 13 is a true scale deformation and color-coded stress display of a computer simulation of an exemplary embodiment of a force-resisting member of the force-resisting device including the active element undergoing progressively plastic deformation in tension.

DETAILED DESCRIPTION OF PREFERRED EMBODIMENTS

Definitions

As used herein the following terms are to be understood to be defined as described below. "Load sharing" shall be understood to define the carrying of a total load by some division among more than one load-bearing element. For example, parallel load bearing elements carry load in proportion to their stiffness, while series load bearing elements carry full load (i.e., do not share load).

"Transmit" shall be understood to define the capacity of an element to withstand applied forces and to react them from one location to another, according to the laws of mechanics, specifically force equilibrium. Transmission of forces of an element within a system always depends on its geometric configuration and its strength capacity relative to the force magnitude to be transmitted, and in some instances on its stiffness.

"Load path" shall be understood to define a route for load to be transmitted.

"Dissipation" shall be understood to define a process of conversion of energy from an undesirable motion form permanently and irreversibly to a benign form, which as one example involves converting mechanical work energy (force acting over a distance) into plastic strain energy of a material, and subsequently heat energy. Dissipation is effected by mechanical damping and plasticity, and can be used to reduce maximum deflection of structures subjected to external forces.

"Absorption" shall be understood to define a process of conversion of energy from an undesirable motion form reversibly and temporarily to a benign form, which as one example involves converting mechanical work energy (force acting over a distance) into elastic strain energy of a material, which can be later restored. Such absorption is effected by mechanical stiffness or springs, and can be used to reduce maximum deflection of structures subjected to external forces.

"Force resisting" shall be understood to define the ability of a device to transmit structural forces, to dissipate energy by some means, and to absorb energy by some means, in some absolute magnitude and relative proportion.

"Shear wall" shall be understood to define a structure capable of resisting shear forces, the shear wall being constructed of framing members having a sheathing material disposed thereon. The framing members may be constructed of wood, metal or similar materials.

"Active element" shall be understood to define a load-bearing element with defined load versus deflection properties that may be designed by engineering analysis in one or more directions or degrees of freedom. The active element is a device configured to deflect or distort in a controlled manner under load.

"Finite element analysis" shall be understood to include the use of a computer model based on the finite element mathematical method to predict reaction forces, deformations, stresses, and strains of a structure in response to applied forces or enforced displacements.

"Discontinuous structural element" is herein defined as any load bearing structure or portion of load bearing structure that has some feature within it that makes the structure's force transmitting, stiffness (absorbing), dissipating, absorbing, or strength characteristics non-uniform, and results in a change of load sharing within the structure, influences the proportion of load shared by the structure relative to adjacent structures, or causes stress concentrations in the structure. Examples of features that cause discontinuous structural elements are door and window openings, localized overly stiffened structural elements, coupled structural elements with different stiffness properties, asymmetrical building configurations, locations in a structure where relative movement of adjacent parts may occur during a loading event, or other similar features.

"Generally continuous shear wall" shall be defined as a shear wall that behaves substantially the same as a continuous shear wall at its edges, i.e. load versus deflection, stiffness, and dissipation characteristics are similar, despite the presence of discontinuities within it.

"Drift" shall be understood to define the amount of deflection or movement of a shear wall or structural element due to a load applied thereto.

"Retrofit" shall be understood to include remodeling, reconstruction, structural upgrading, strengthening, fabrication of shear walls, or similar constructions processes.

The present invention provides devices and methods for maintaining the strength, stiffness (absorption), and dissipation properties of a structure, wherein said properties have been lost due to an opening or other discontinuity formed within the structure. In the case of an opening, the force-resisting device of the invention transmits the forces and dissipates and absorbs energy at the edge of the opening in such a manner that the exterior edges of the structure into which the opening is cut behave under shear load substantially as if there were no opening formed in the structure. As utilized herein, it shall be understood that the term structure is intended to refer to the entire building structure or to a portion of the entire building structure, such as a shear wall.

The device in accordance with one exemplary embodiment includes a lightweight force transmitting and energy dissipating and absorbing force-resisting device that may be disposed about an opening formed in a shear wall. The force-resisting device contains active elements that have defined force versus deflection properties, which may be designed by engineering analysis, such that the forces developed about the opening due to shear on the wall are transmitted around the opening. By designing the proper force-resisting device and active elements, the stress concentrations at the periphery of the opening are mitigated so that the strength of the structure is substantially the same as if an opening had not been formed within the wall, thereby enabling a shear wall having an opening formed therein to behave as a generally continuous shear wall.

Figure 1:
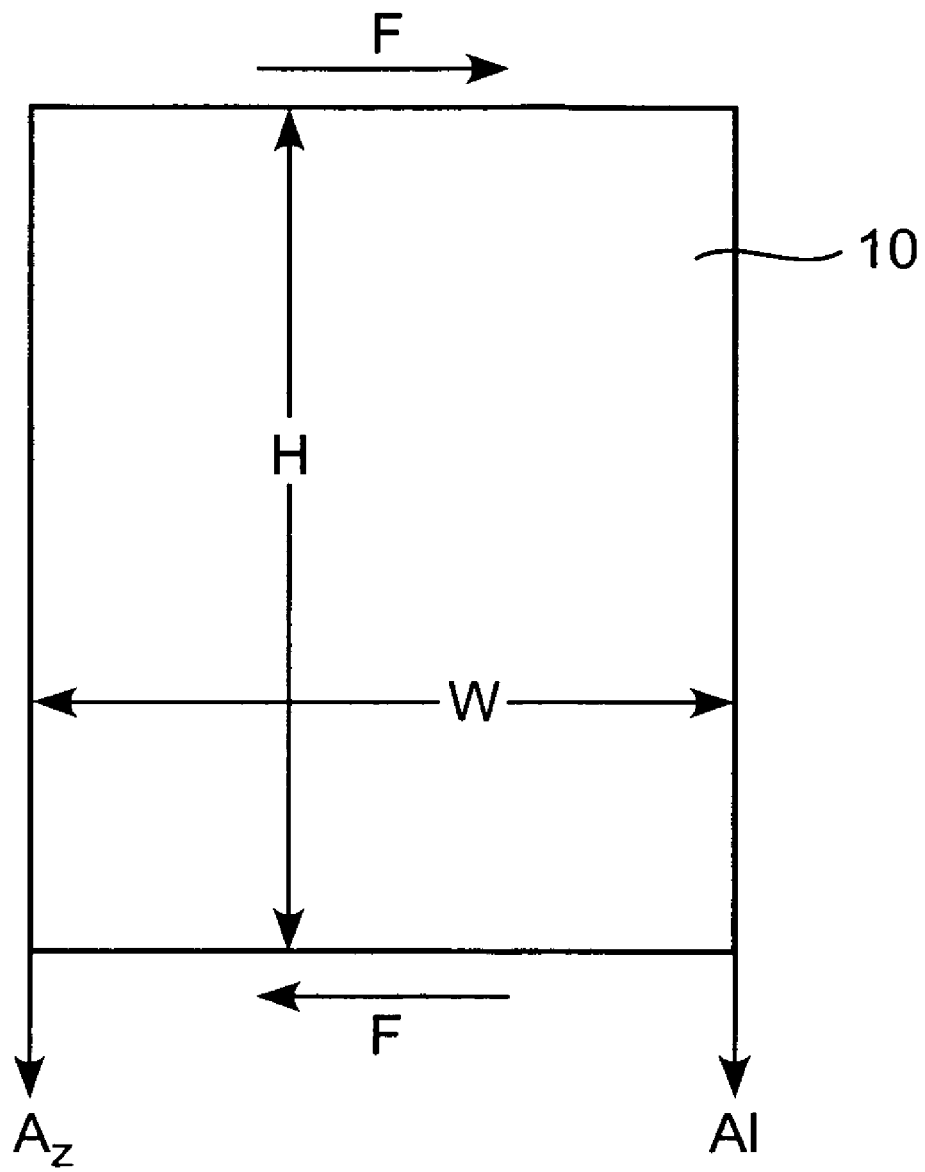
FIG. 1 is an elevational view of an exemplary shear wall illustrating the balance of forces applied thereto.
Figure 2A:
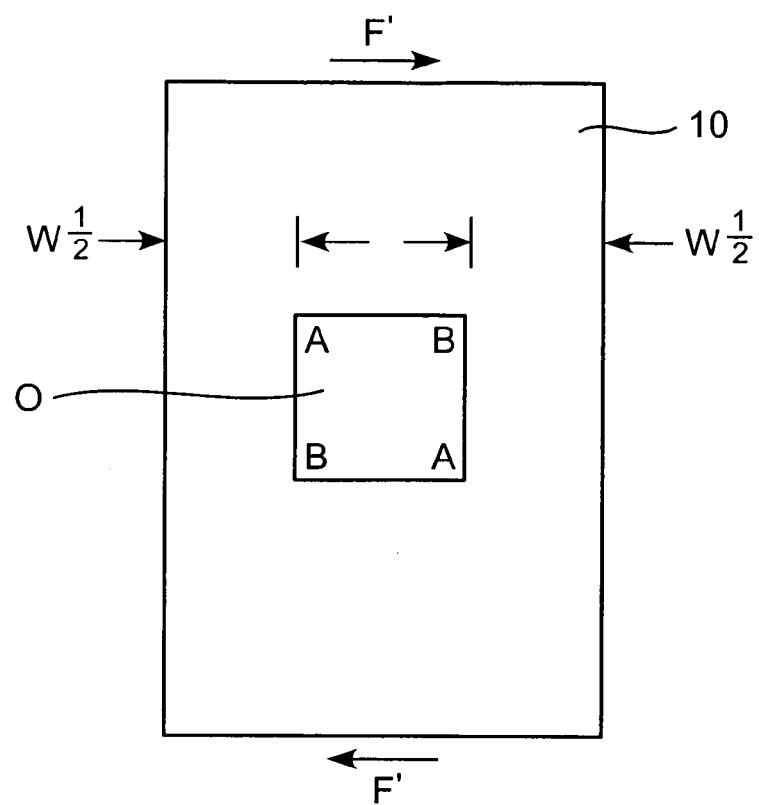
FIG. 2A is an elevational view of an exemplary shear wall including an opening formed therein illustrating the reduction of load bearing width.
Figure 2B:
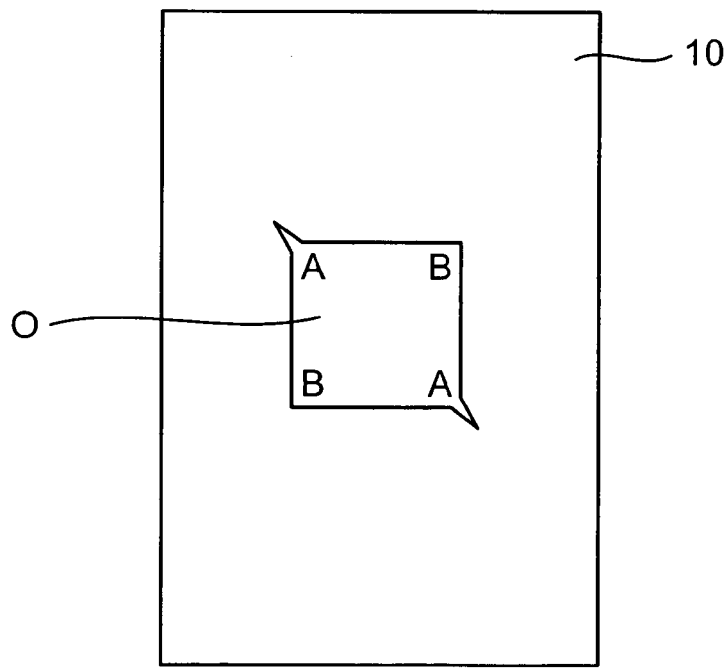
FIG. 2B is an elevational view of an exemplary shear wall including an opening formed therein illustrating the concentration of stresses in the corners of the opening.
Figure 3:
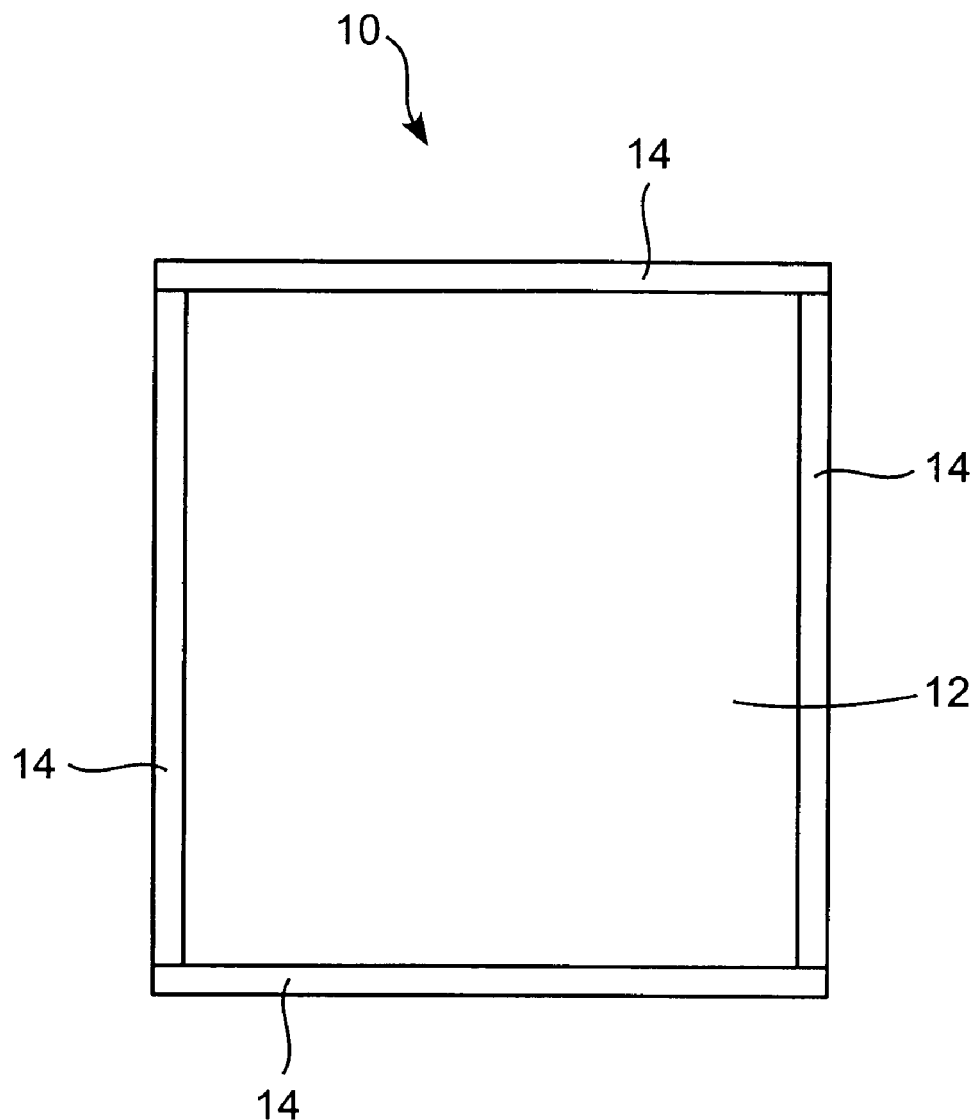
FIG. 3 is an elevational view of the backside of an exemplary shear wall illustrating the stud framing and sheathing attached thereto.

Referring now to FIG. 3, there is shown a shear wall 10. The shear wall 10 as shown FIG. 3 includes, a four-foot by eight-foot plywood sheathing panel 12, and a plurality of two inch by four-inch studs 14 disposed about the periphery of the panel. The shear wall 10 as shown in FIG. 3 mimics a typically constructed shear wall in a structure such as a private home. It shall be understood that the shear wall 10 illustrated in FIG. 3 shall be understood as being exemplary; the shear wall may be constructed of metal framing having a plywood panel disposed thereon. Furthermore, it is contemplated that other engineered materials may be utilized for both the framing elements as well as the sheathing material.

Figure 4A:
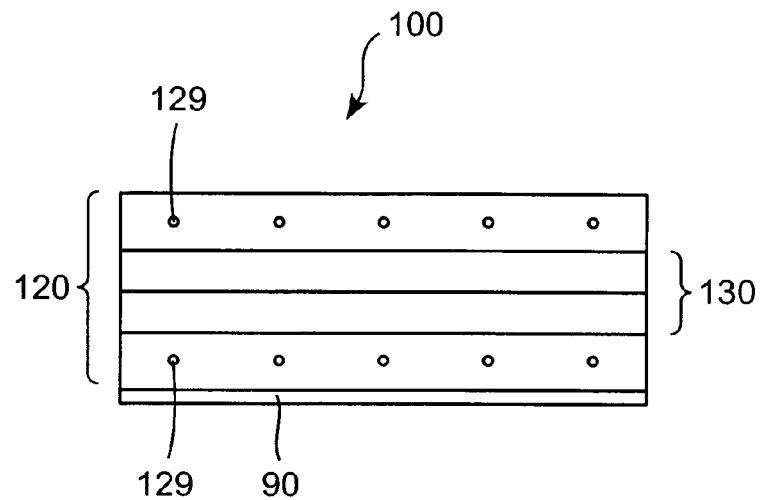
FIG. 4A is an elevational view of an exemplary embodiment of the force-resisting device in accordance with the present invention.

Referring now to FIG. 4A there is shown an exemplary embodiment of the force-resisting device 100 in accordance with the present invention. As shown in FIG. 4A, the force-resisting device 100 includes an active element 130 disposed within a force-resisting member 120. The force-resisting member 120 may further include a plurality of apertures 129 disposed adjacent to the active element 130, wherein the apertures are configured to receive connection means for connecting the active element to a structure. Still further, the force-resisting device may include a frame element 90, wherein the frame element 90 may be coupled to the force-resisting member 120. As shown in FIG. 4A, the active element has defined force versus deflection properties, wherein the active element is configured to provide a load path across a discontinuous structural element.

Figure 4B:
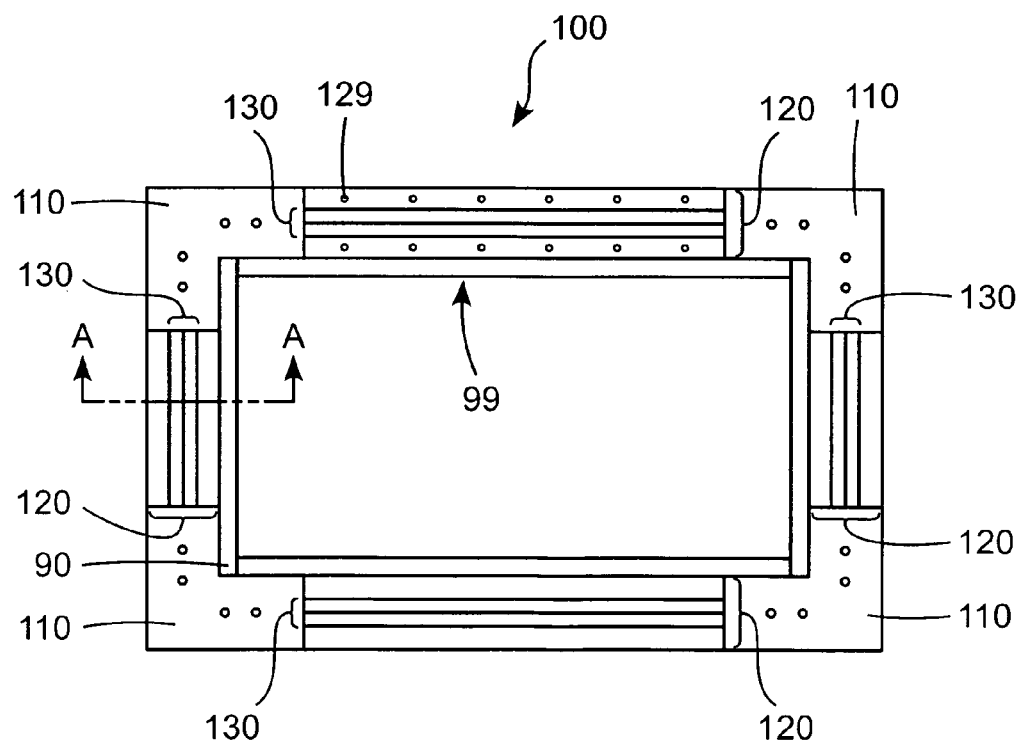
FIG. 4B is an elevational view of an exemplary embodiment of the force-resisting device according to the present invention.

Referring now to FIG. 4B, there is shown an alternative exemplary embodiment of the force-resisting device 100 in accordance with the present invention. As shown in FIG. 4B, the force-resisting device includes at least one active element 130; the active element disposed within a force-resisting member 120, at least one frame element 90, and at least one reinforcement element 110. As shown in FIG. 4B, the force-resisting device 100 is shown as being configured to be disposed about a discontinuous structure, such as an opening formed in a structure. It shall be understood that the reinforcement element 110 may be fixedly attached to the opening periphery utilizing suitable known means such as screws, bolts, glues, or nails. Additionally, the reinforcement element 110 may be fixedly connected to an end of the force-resisting members 120 through the use of fastening means such as those above. Further still, it is contemplated that the reinforcement element 110 and the force-resisting member 120 may be formed as a unitary member. It is also contemplated that the reinforcement element 110 and the force-resisting member 120 may not be connected directly, but may be individually connected to the shear wall adjacent to the opening, or to some intermediate members, or to a mounting frame disposed about the periphery of the opening. The force-resisting device 100 as shown in FIG. 4B and described above is shown as being configured to be disposed about an opening, therefore the force-resisting device includes at least four force-resisting members 120 and at least four reinforcement elements 110. Additionally, as shown in FIG. 4B, the frame elements 90 are configured to be disposed about the periphery of the opening thereby forming a frame 99. The force-resisting members 120 and/or the reinforcement elements 110 are attached at one side, to the opening periphery either directly or indirectly, and at the other side to the frame 99 or a structure disposed about the opening, so that forces can be transmitted across the opening.

Frame elements 90 or frame 99 may be configured having a variety of structural properties. For example, the frame 99 or the frame elements 90 may be made sufficiently rigid such that any forces applied to the frame will be transmitted with little deflection. Alternatively, the frame 99 may be configured to be "soft" or flexible, thus, the frame 99 can be configured to function as an additional active element in conjunction with the other active element(s) embodied in the force-resisting device 100 in accordance with the present invention. It is further contemplated that the geometry of the frame 99 may be adjusted such that the frame 99 includes a plurality of active elements formed therein. For example, the frame may be constructed including multiple "active folds." It shall be understood that the reference to active folds above should not be considered limiting and that other geometries and embodiments of the active element as described herein may be embodied in the frame 99 or frame elements 90.

The frame 99 may be further configured to include mounting area(s) to receive and retain elements, such as windows and doors. The frame 99 may be configured to receive windows or doors in different manners. For example, the mounting area may include a soft and resilient interface to allow the force-resisting device, including window or doorframe, to flex as needed, and allow the window or door to float within the frame. Second, the mounting frame may be rigid, to keep deflections so low that the window or door are not loaded even if fixedly connected to the frame, while the active element(s) sustains all the deflection. Still further, these mounting areas can be used to provide accurate openings into which the doors and windows could be fitted without the conventional use of shims, thus cutting down installation time and adjustment and reducing the risk of distortion of window and door frames by improper installation or subsequent settling of the building. This aspect of the invention is especially valuable in the case of vinyl-framed doors and windows, which are comparatively soft, and easily distort. Incorporating a mounting frame within the force-resisting device 100 provides an additional benefit of reducing air gaps around the window or door openings that may lead to energy loss. Yet another benefit of forming a door or window frame within the force-resisting device 100 is that this not only provides the advantages previously mentioned, but also distributes any loads from attempted forced entry directly into the structure of the wall containing the opening, thus providing greatly enhanced security for openings, as opposed to conventional door/window frames, which are simply nailed into the rough framing of the building. An additional safety function is also introduced by providing a proper mounting for doors and windows, therefore the likelihood of a window shattering or a door becoming stuck or jammed due to forces applied during an earthquake is reduced because the device according to the present invention transmits force about the opening thereby reducing the amount of force applied to the windowpanes and/or door.

The function of the invention may be achieved with less hardware than shown in the exemplary embodiments of FIGS. 4A and 4B. It is contemplated that the force-resisting device according to the present invention may function with a single active element, provided the active element is attached at a first end to the opening periphery and at a second end to some structure that reacts the forces transmitted through the active element to some other location about the opening. For example, the device of FIG. 4B could be reduced to a single force-resisting member at the left side which is attached at one end to the left side of the opening and at the other end to an "L" shaped frame along the left and top of the opening, which is in turn rigidly fixed by some means to the opening periphery along the top. In this case, load is transmitted from the left side of the opening, through the active element, through the frame, to the top edge of the opening (not through a second active element). However, for best load distribution, stress control, and simplicity, symmetrical configurations using two opposing or all four opening sides of a rectangular opening (or configured similarly about a non-rectangular opening) are preferred.

The reinforcement element 110 and the force-resisting member 120 as shown in FIGS. 4A and 4B may be constructed of materials such as steel, stainless steel, aluminum, copper, brass, titanium, or other metals. It is further contemplated that the reinforcement element 110 and the force-resisting member 120 may be constructed of engineered composite materials such as fiberglass, carbon fiber, graphite, Spectra®, or similar composite materials. Still further, it is contemplated that the reinforcement element and the force-resisting member may be constructed of a combination of any of the materials listed above and other materials not listed. It shall be understood that the list of materials above is merely exemplary and should not be considered limiting in any manner; it is contemplated that other materials not listed may be utilized in the construction of the reinforcement element or the force-resisting member in accordance with the present invention.

Although the force-resisting device 100 is illustrated in FIG. 4B as being formed of multiple reinforcement elements and force-resisting members, which are then assembled, it is contemplated that the force-resisting device according to the present invention may be constructed as a unitary member. Furthermore, although the present invention has been illustrated as being disposed about a window opening formed within a shear wall, it is contemplated that the force-resisting device 100 according to the present invention may be utilized around any type of opening or structural discontinuity. For example, in a door or hallway opening where there is no remaining shear panel along the lower edge of the opening, loads may be transferred across the bottom of the opening through the use of a structural sill plate or by utilizing an existing sill plate, if the existing sill plate is capable of transmitting the applied loads. In some cases, with proper design of the side and top of the force-resisting device, it will also be feasible to eliminate the bottom element altogether. Further still, if the foundation has mechanical properties sufficient to carry the appropriate forces, the vertical elements of the force-resisting device 100 may be attached to the foundation.

Figure 5:
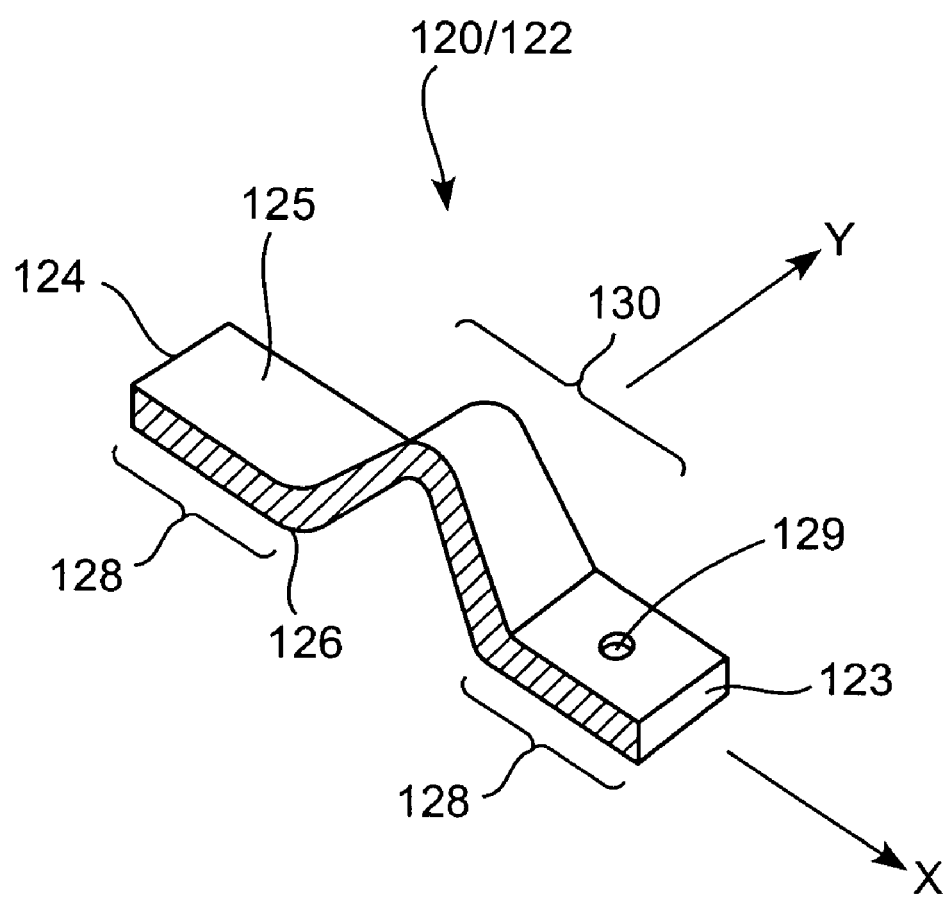
FIG. 5 is a sectional perspective view of an exemplary embodiment of a force-resisting member of the force-resisting device, taken about line A—A of FIG. 4B, which contains an active element according to the present invention.

Referring now to FIG. 5 there is shown a sectional perspective view of an exemplary embodiment of the force-resisting member 120 in accordance with the present invention. As shown in FIG. 5, force-resisting member 120 includes the active element 130 formed within an elongated member 122, the elongated member 122 having a first end 123, a second end 124, the active element 130 having defined force versus deflection properties in the X and Y directions, such that the active element is configured to provide load sharing across a discontinuous structural element. The active element 130 as shown in FIG. 5 is shown as being embodied as an "active fold" formed within the elongated member 122 and disposed between the first end 123 and the second end 124, and formed between the edges of the elongated member 122. As shown in FIG. 5, the first surface 125 and second surface 126 adjacent to either side of the active element 130 are substantially parallel to each other, but they need not be. Further still, it is contemplated that the force-resisting member 120 may further include apertures 129 disposed through the substantially horizontal portions 128 of the elongated member adjacent to the active element 130.

Although the active element is described and shown as being an "active fold" it is contemplated that other geometries and mechanical structures could be utilized. For example, the active element may comprise any one of the following devices individually or in any combination thereof. Examples of such active elements are: at least one cutout, a single slot, a plurality of slots (where in all cases the remaining material is the active element), a plurality of folds, a plurality of pins and engaging members (where the pins or engaging members deflect/distort), or an aperture having a web disposed thereacross (where the web deflects/distorts). It shall be further understood that the examples above are merely exemplary and should not be considered limiting in any manner. Any geometry and combination(s) of materials can be used for the active element that generates a useful force versus deflection property when loaded in one or more directions.

The active element 130 may be formed within the elongated member 122 utilizing known manufacturing processes such as pressing, bending, casting, cutting, or other methods suitable for the material used. The force-resisting member 120 and active element 130 in accordance with the present invention may be constructed of materials such as those listed above with regard to the reinforcement element 110, or combinations of more than one material. Under certain conditions, it may be desirable to further tune the force versus deflection properties of the active element 130. The force versus deflection properties of the active element 130 can be tuned by increasing/decreasing the height of the active element, providing multiple active elements within the elongated member 122, adjusting the geometry of the active element(s), varying the material thickness of the active element and/or of the elongated member 122, or other variations. For example, it may be desirable to provide more energy dissipation or absorption under greater earthquake forces that result in overall building deflections greater than the two inches required by the code. The active element 130 may produce force versus deflection properties under tension and compression in direction X and opposing senses of shear in direction Y as the building will sway back and forth under earthquake loads producing an oscillating response.

It shall be understood that the principle of the active element 130 may be incorporated into any other type of structural building connector wherein the connector is designed to transmit forces and dissipate/absorb energy. For example, at least one active element may be incorporated into building connectors adapted to attach two portions of a structure having dissimilar modulus or stiffness, such as a concrete wall to a timber framed structure. Alternatively, active element 130 may be embodied within a corner force-resisting device (not shown) on a shear wall. The corner force-resisting device may be connected to the framing members and the top or bottom plate of the shear wall. The corner force-resisting device may be designed so that as forces are imposed at a joint during a loading event, the corner force-resisting device transmits force and dissipates/absorbs energy via a defined force versus deflection property, which may be designed by engineering analysis. Depending on the structural location of the application in a building or structure, the force versus deflection property may be designed for differing absolute and relative levels of stiffness and dissipation. It shall be understood that the building connectors above are merely exemplary and should not be considered limiting in any manner; it is contemplated that other building connectors not listed may be utilized wherein the connector is designed to transmit forces and dissipate/absorb energy. Such benefits can be obtained at any location in a structure where relative movement of adjacent parts may occur during a loading event.

Referring now to FIGS. 6–9, there are shown computer models and color coded results of computer simulations of an exemplary shear wall with and without the force-resisting device according to the present invention undergoing "drift" (deflection) in response to in-plane shear forces as in an earthquake. FIGS. 11–13 show computer models and color coded results of computer simulations of the active element 130 undergoing deformation due to force application. The analysis results presented in FIGS. 6–13 are provided to aid in understanding of the function of the invention, and are not to be considered limiting in any way.

Figure 6:
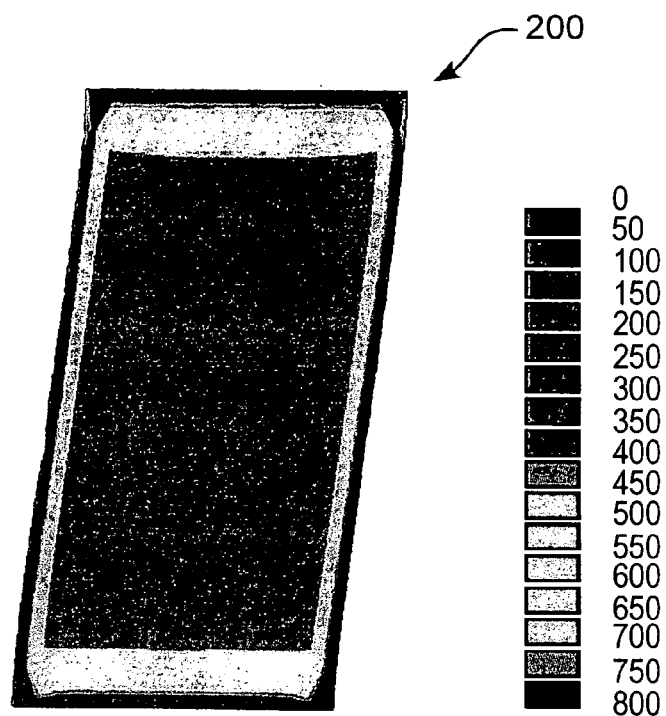
FIG. 6 is an exaggerated deformation and color-coded sheathing shear stress display of a computer simulation of an exemplary shear wall undergoing deflection due to a shear force applied thereto.

Referring now to FIG. 6 there is shown an exemplary shear wall 200 undergoing drift due to an applied shear force. In each of the displays illustrated in FIGS. 6, 7, and 9, the drift was restricted to two inches maximum because two inches of drift is a requirement generally accepted by present building codes for an eight-foot high wall, and the deflection is exaggerated for viewing clarity. As shown in FIG. 6, for a solid plywood shear wall, loaded to produce the maximum code allowable two inches of drift requires a force of approximately 9855 pounds to be applied to the shear wall. Additionally, as shown in FIG. 6, the stresses within the solid shear wall sheathing are distributed smoothly throughout the panel and around the periphery of the shear wall.

Figure 7:
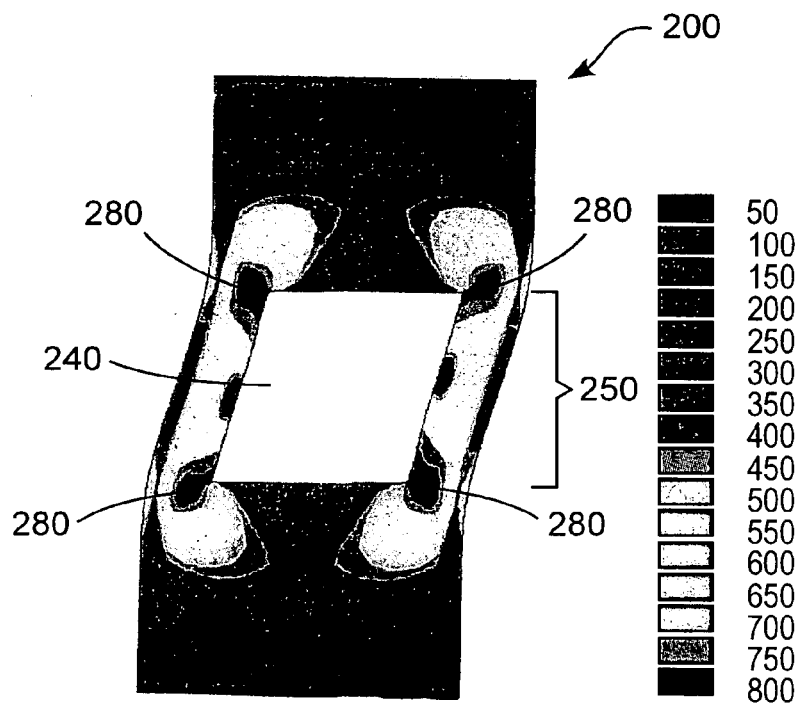
FIG. 7 is an exaggerated deformation and color coded sheathing shear stress display of a computer simulation of an exemplary shear wall having an opening formed therein, wherein the shear wall is undergoing deflection due to a shear force applied thereto.

Referring now to FIG. 7, there is shown the shear wall 200 wherein an opening or discontinuity has been formed therein. The opening formed within the shear wall models a typical window opening of about 30 inches×30 inches. As shown in FIG. 7, the center portion 250 adjacent to the opening 240 deflects greatly due to the applied load. As shown, the shear wall deflects the allowed two inches when only 2807 pounds have been applied to the shear wall. Thus the load resisting capacity of the shear wall 200 is reduced by a factor of almost four. Furthermore, as shown in FIG. 7, the opening also produces extreme concentration of stresses in the corners of the opening as can be evidenced by the red stress pattern indicators 280.

Figure 8:
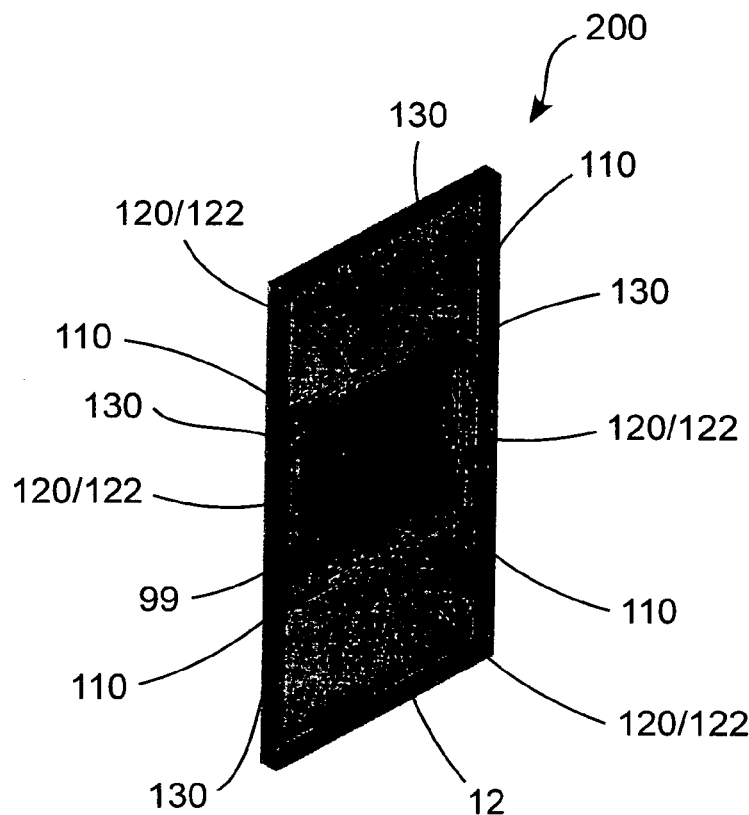
FIG. 8 is a display of a computer model of an exemplary shear wall illustrating schematically the force-resisting device according to the present invention as disposed about the periphery of an opening formed within the shear wall.

Referring now to FIG. 8, there is shown the backside of the model of the shear wall 200. As shown in FIG. 8, the force-resisting device 100 of the present invention has been disposed about the periphery of the opening 240 formed within the shear wall 200. The force-resisting device 100 includes, in this case, four force-resisting members 120 in communication with the periphery of the opening, wherein each of the force-resisting members are configured to restore stiffness and dissipation capacity to the shear wall by transferring forces about the periphery of the opening/discontinuity through controlled deformation of the active elements.

It shall be understood that the active element may be configured to deform plastically, elastically, or in any combination thereof. For example, the active element may initially deform elastically, then as loads increase deform plastically until a predetermined amount of deformation has occurred, then deform elastically again, or the active element may act in a progressive elastic or plastic manner.

As shown in FIG. 8, the force-resisting device 100 includes two horizontal force-resisting members 120 and two vertical force-resisting members 120. The force-resisting members 120 each include an active element as described in detail above with reference to FIGS. 4A, 4B and 5. Further still, the horizontal and/or vertical force-resisting members 120 are attached to the plywood panel 12 utilizing fasteners such as screws, bolts, glues, rivets or similar products disposed through the apertures formed in one end portion of the elongated member(s) 122. In addition to being attached on one end to the shear wall, a second end of the force-resisting members 120 may be attached to the frame 99, wherein the frame 99 may be configured as described above. It is further contemplated that the force-resisting device 100 in accordance with the present invention may comprise a mounting device configured to be disposed peripherally about an opening. In a preferred embodiment the mounting device is formed as a unitary member including at least four corner elements and elongated plate members extending therebetween. The mounting device configured to be affixed to the shear wall and to receive at least one force-resisting member 120 thereon. It is further contemplated that the mounting device may be integrally formed with the frame 99 and the force-resisting member 120.

The force-resisting member including the active element is designed to implement the desired known force versus deflection properties of the active element. This allows the engineer to select and design the proper active element that will provide load sharing across a discontinuity formed in the shear wall such that the shear wall including the force-resisting member performs substantially as if no opening existed in the shear wall. This allows an engineer to "tune" the building such that all of the shear walls behave in a similar manner so that a force concentration is not created in any portion of the building that could lead to failure of the building.

As embodied in the present invention and illustrated in the sample computer simulation figures, the active element is configured to undergo deformation, thus carrying the loads from the edge of the plywood panel opening in tension and compression across the active element and at the same time absorbing and dissipating energy. This particular modeled design uses steel of the requisite shape and thickness, but it is obvious to one skilled in the art that a wide range of materials and configurations in many combinations can be employed to produce suitable force/deflection properties.

Figure 9:
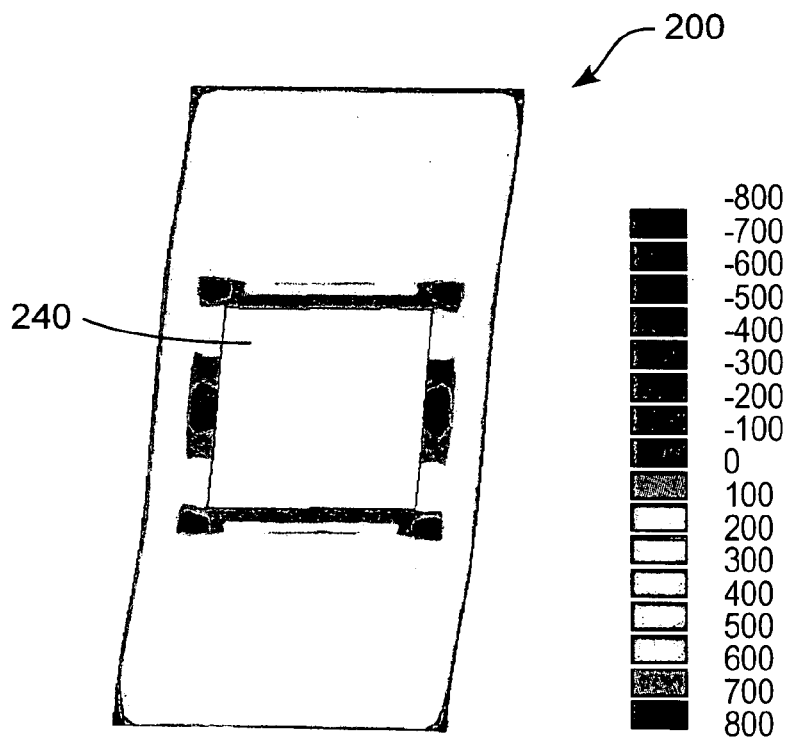
FIG. 9 is an exaggerated deformation and color-coded sheathing shear stress display of an exemplary shear wall having an opening formed therein and the force-resisting device disposed thereabout, wherein the shear wall is undergoing deformation due to an applied force.

Referring now to FIG. 9, there is shown the modeled shear wall undergoing drift due to a shear force applied thereto. As shown in FIG. 9, to achieve two inches of drift in the shear wall 200 including the force-resisting device 100 designed for this size opening, in this size and configuration shear panel, requires 10,705 lb for force. Comparing this to FIGS. 6 and 7 it can be seen that the shear wall including the opening 240 and the force-resisting device 100 behaves substantially like the shear wall 200 as shown in FIG. 6 with no opening. That is, with the force-resisting device 100 disposed about the periphery of the opening the shear wall including the opening functions in nearly the same manner as that of a solid shear wall, i.e. it transmits substantially similar shear force for a given deflection, and the stresses in the panel are not concentrated and do not result in premature failure. This can be better understood with reference to the graph shown in FIG. 10.

Figure 10:
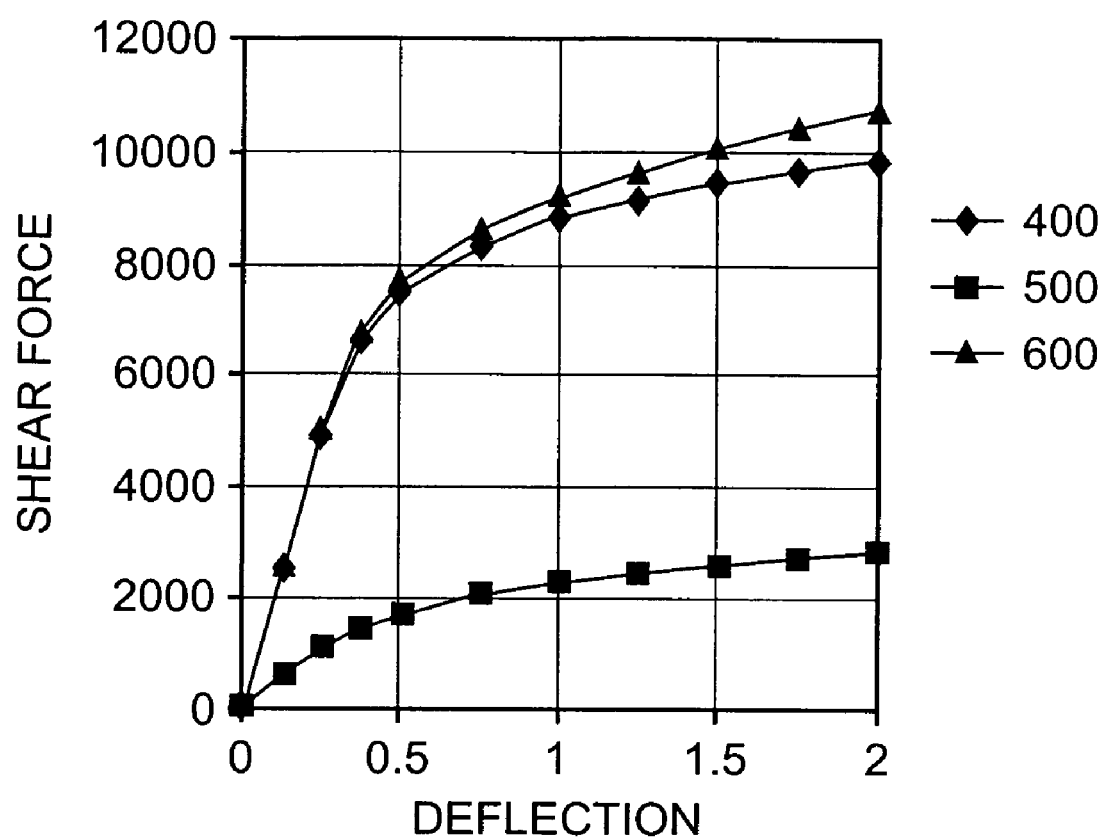
FIG. 10 is a graph illustrating the shear load versus deflection properties of an exemplary shear wall, an exemplary shear wall having an opening, and an exemplary shear wall including the force-resisting device according to the present invention.
Figure 11:
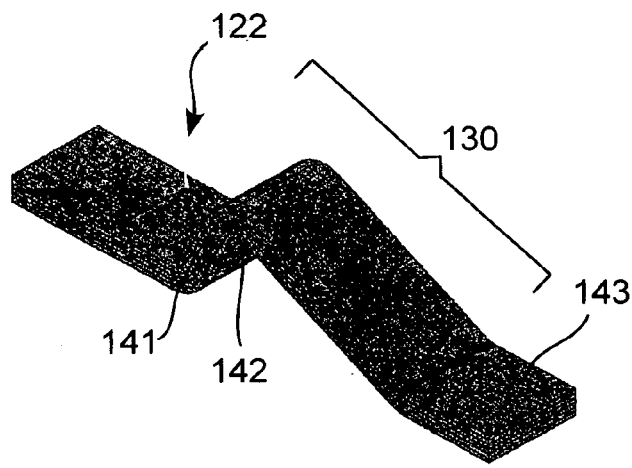
FIG. 11 is a sectional perspective view of a computer model of a portion of an exemplary embodiment of a force-resisting member of the force-resisting device, taken about line A—A of FIG. 4B, including an active element according to the present invention.

Referring now to FIG. 10 there is shown a graph illustrating the performance of the shear wall 200 shown in FIGS. 6–9. As shown in the graph in FIG. 10, the present invention when disposed about an opening formed in a solid shear wall replaces all of the lost stiffness and dissipation capacity of the solid panel. It will be appreciated that the force versus deflection properties of the invention can be adapted to suit a wide range of plywood thickness and other shear panel and sheathing material characteristics. The exemplary shear wall modeled in FIGS. 6–9 was modeled to replicate ½" Douglas fir plywood shear wall sheathing as this is typical of materials used in conventional building practice. Referring now to the graph illustrated in FIG. 10, there is shown three separate load versus deflection characteristic lines. The first line 400 illustrates the load versus deflection characteristics of the solid shear wall of FIG. 6, and the second line 500 illustrates the load versus deflection characteristics of the shear wall including a 30 inch by 30 inch window opening as illustrated in FIG. 7. As can be seen by the difference between line 400 and line 500 the creation of the opening within the solid shear wall drastically reduces the load bearing capacity of the shear wall. Referring now to line 600, there is shown the load versus deflection characteristics of the shear wall including the 30×30 inch opening and the force-resisting device 100 in accordance with the present invention disposed about the periphery of the opening. As shown in the graph of FIG. 10, the present invention restores the shear capacity of the shear wall such that the shear wall including the present invention and a 30×30 inch opening formed therein performs substantially similar to a solid shear wall. Thus, it can be seen that the force-resisting device is configured to resist forces and reduce stresses and replace stiffness, dissipation, and strength to the structure such that the structure behaves substantially as if a discontinuous structural element has not been formed therein.

Thus it can be seen with reference to FIGS. 4B, 6–10 in accordance with the present invention there is provided a force-resisting device for transmitting forces and dissipating and absorbing energy across a discontinuous structural element of a structure by providing at least one active element having at least a first end and a second end, the active element having defined force versus deflection properties and configured to transmit forces and dissipate and absorb energy, wherein the first end of the active element is configured to be connected to a structure. The force-resisting device further includes at least one frame element disposed about a discontinuous structural element, wherein the frame element is configured to be connected to a second end of the active element, the active element and the frame element configured to resist forces and reduce stresses and replace stiffness, dissipation, and strength to the structure.

Thus it can be seen with reference to FIGS. 4B, 6–10 in accordance with the present invention there is provided a force-resisting device for transmitting forces and dissipating and absorbing energy across a discontinuous structural element of a structure by providing at least one active element having at least a first end and a second end, the active element having defined force versus deflection properties and configured to transmit forces and dissipate and absorb energy, wherein the first end of the active element is configured to be connected to a structure. The force-resisting device further includes at least one frame element connected to a discontinuous structural element, the frame element is configured to be connected to a second end of the active element, wherein the active element and the frame element configured to resist forces applied to the structure by transmitting forces across the discontinuous structural element.

Additionally, it can be further seen with reference to FIGS. 4B, 6–10 in accordance with the present invention there is provided a force-resisting device for transmitting forces and dissipating and absorbing energy across a discontinuous structural element of a structure by providing at least one active element having at least a first end and a second end, the active element having defined force versus deflection properties and configured to transmit forces and dissipate and absorb energy, wherein the first end of the active element is configured to be connected to a structure, and at least one reinforcement element, the reinforcement element configured to be connected to the structure. The force-resisting device further includes at least one frame element disposed about a discontinuous structural element, wherein the frame element is configured to be connected to a second end of the active element, the active element, frame element, and reinforcement element configured to resist forces applied to the structure by transmitting forces across the discontinuous structural element and are further configured to reduce the stresses and replace stiffness, dissipation, and strength to the structure.

Thus it can be seen with reference to FIGS. 4B, 8, 9, and 10 in accordance with the present invention that there is provided a method for restoring stiffness, energy dissipation capacity, and strength of a structure containing a discontinuous structural element by transmitting forces across the discontinuous structural element, thereby providing load sharing across the discontinuity.

It will be appreciated by one skilled in the art that the large number of calculations required to produce an active element having accurately known force versus deflection properties over the entire working deflection range requires the use of a finite element analysis (FEA) computer program capable of iterative calculations to optimize the performance of the active element. An example of such a program is ANSYS, available from ANSYS, Inc. in Houston, Pa. While it is true that the active element can be designed without the use of a computer, to properly optimize the design would require an overly excessive number of calculations and would not be accurate. Therefore, the use of a computer model in a finite element analysis program is the preferred embodiment.

Thus it can be seen with regard to FIG. 10 there is provided a method for selecting a force-resisting device, the force-resisting device being configured to transmit loads and to dissipate and absorb energy by selecting a structural element to be reinforced and selecting a design configuration of a force-resisting device, the force-resisting device including at least one active element and selecting a design configuration for the active element, then building a computer generate finite element model of the force-resisting device with at least one active element having at least one degree of freedom for transmitting force and dissipating and absorbing energy, and using the computer generated finite element model in a finite element analysis program to iterate the design of the active element to produce defined force versus deflection properties.

Referring now to FIGS. 11–13 there is illustrated a color computer simulation simulating the forced response of the modeled sample active element in accordance with the present invention.

Referring now to FIG. 11, there is shown a perspective view of a section of an exemplary force-resisting member 120 including the active element 130, wherein no force has been applied. The active element 130 being defined by three bend points 141, 142, and 143.

Referring now to FIG. 12, there is shown a sectional view of an exemplary model of a force-resisting member 120 and the active element 130 wherein a force has been applied to the force-resisting member 120 in the X direction of FIG. 5. As shown in FIG. 12, the active element undergoes compression resulting in localized elastic and plastic bending primarily at the three pre-bent points 141, 142, and 143. The elastic bending effects energy absorption and the plastic bending effects energy dissipation, while the geometry and size of the active member provides for the ability to transmit sufficient load to be effective without material failure. Also, to avoid failure, a ductile metal is used for this case.

Referring now to FIG. 13, there is illustrated a cross-sectional view of an exemplary model of a force-resisting member 120 wherein a tension force has been applied thereby causing the active element 130 to elongate. By elongating as shown in FIG. 13, the active element is subjected again to localized elastic and plastic bending primarily at the three pre-bent points 141, 142, and 143, resulting in absorption, dissipation, and load transmitting effects similar to the compression case.

As the active element undergoes compression or tension as illustrated in FIGS. 12–13, the active element behaves in a general manner similar to that of the materials of which the shear wall has been constructed. That is, the force-resisting device 100 according to the present invention is not intended to create a rigid non-yielding structure within the shear wall; instead the active element is configured to behave in a progressively plastic manner similar to the natural behavior of the surrounding plywood panel structure and to not create an overly stiff portion which would cause the forces to become concentrated therein.

It will be appreciated that different elements of the invention can be manufactured in many ways, either stamped, rolled or bent from one or more pieces of steel or other material, produced with separate reinforcement elements as in the embodiment shown. It can be made of non-metal materials such as engineered plastics and engineered wood-based products or other engineered materials either alone or in combination with any of the materials listed above in conjunction with steel and other materials as long as the force versus deflection properties are as desired. Use of different materials can also allow reduced heat transmission; it is often desirable to reduce heat loss through doors and windows to increase the energy efficiency of the structure. Use of different materials and combination of materials can also facilitate installation, by mechanical fasteners, gluing or bonding, interlocking or capture between studs and shear panels or other elements of the adjacent structure or other fastening means. It shall be appreciated that the force-resisting device in accordance with the present invention may be utilized for new building construction or for retrofits by providing a lightweight device that may be easily adapted for use within different areas or portions of a structure.

The implementation of force-resisting devices for different size openings or different discontinuity features in different configurations of shear walls may be done without changing the design or geometry of the active element by using tailored specific lengths of the same force-resisting elements on one or more sides of the opening or discontinuity.

The implementation of force-resisting devices for different size openings or different discontinuity features in different configurations of shear walls may be done by varying the active element design, by using tailored specific X and Y directional force-resisting behavior on one or more sides of the opening or discontinuity. For example, in some cases, suitable force-resisting devices can be developed using only vertical side force-resisting members with no horizontal top and bottom force-resisting members, provided the Y or vertical direction stiffness of the remaining vertical members is high in proportion to the X or horizontal direction stiffness, such that the assembly does not rotate appreciably under load.

The implementation of force-resisting devices for different size openings or different discontinuity features in different configurations of shear walls may be augmented by using the frame 99 or frame elements as an additional active element. For example, the frame itself may be designed to dissipate energy by plastic deformation in addition to stiffness and ability to transmit forces. This would in most cases require the window or door in the frame to be mounted resiliently to avoid damage.

Although the present invention has been described in detail with regard to resisting lateral or in-plane forces, as will be appreciated by one having ordinary skill in the art, the force-resisting device according to the present invention is also applicable to substantially horizontal perpendicular loads and/or rotational loads which may be applied to a structure.

Although the present invention has been described with reference to specific embodiments, it shall be understood that this should not be considered limiting in any manner. Without departing from the spirit and scope of this invention, one of ordinary skill in the art can undertake various changes and modifications to the present invention to adapt it to various usages and conditions. As such, these changes and modifications are intended to be within the full range of equivalence of the following claims.

We claim:

1. A shear wall panel system, comprising:
   two studs, a first stud on an opposing edge of the system from a second stud;
   a top stud joining the first stud and the second stud at a first edge of the shear wall panel system;
   a bottom stud joining the first stud and the second stud at a second edge of the shear wall panel system;
   a planar sheet of wood-based sheathing; and
   an active element, the active element formed from a sheet of metal,
   wherein the active element, when viewed in cross-section, includes a first planar edge region and a second planar edge region separated by angled surfaces, the angled surfaces angled relative to the first planar edge region and the second planar edge region,
   wherein a first planar edge region is fastened to the first stud and a second planar edge region is fastened by a fastener to a first edge portion of the planar sheet, and
   wherein a second portion of the planar sheet is fastened to the second stud.

2. The shear wall panel system of claim 1, wherein angled surfaces of the active element form a v-shape having an apex angle, and
   wherein a distal edge of the angled surface forming a leg of the v-shape is joined to one of the first planar edge region and the second planar edge region.

3. The shear wall panel system of claim 2, wherein the active element has at least two portions, the first portion at a first location proximal to the top stud and the second portion at a second location distal from the top stud, wherein a first horizontal component of shear on the force resistant building system increases the apex angle in the first portion, and reduces the apex angle in the second portion, and wherein a second horizontal component of shear on the force resistant building system reduces the apex angle in the first portion, and increases the apex angle in the second portion, the first horizontal component of shear generally opposite in direction to the second horizontal component of shear.

4. The shear wall panel system of claim 1, wherein the first planar edge region and the second planar edge region are co-planar.

5. The shear wall panel system of claim 1, wherein the first planar edge region and the second planar edge region are parallel.

6. The shear wall panel system of claim 1, wherein angled surfaces of the active element form a truncated v-shape with a distal end of each leg of the truncated v-shape joined to one of the first planar edge region and the second planar edge region.

7. The shear wall panel system of claim 1, wherein the active element includes two pairs of angled surfaces between the first planar edge region and the second planar edge region, a first pair of angled surfaces oriented in parallel relationship to a second pair of angled surfaces.

8. The shear wall panel system of claim 7, wherein the active element includes a spacer element positioned between the two pairs of angled surfaces.

9. The shear wall panel system of claim 7, wherein the spacer element has a surface that is coplanar with the first planar edge region and the second planar edge region or that is in a plane parallel to the first planar edge region and the second planar edge region.

10. The shear wall panel system of claim 1, wherein the active element has a force versus deflection property under at least one cyclic load that includes an elastic region and a plastic region, and wherein, in the plastic region, deflection increases more per unit load than in the elastic region as load increases.

11. The shear wall panel system of claim 1, wherein angled surfaces of the active element form a v-shape with a distal end of each leg of the v-shape joined to one of the first planar edge region and the second planar edge region.

12. The shear wall panel system of claim 11, wherein the v-shape is non-symmetrical about a bisector of the an apex of the v-shape.

13. The shear wall panel system of claim 1, wherein angled surfaces of the active element form a truncated v-shape with a distal end of each leg of the truncated v-shape joined to one of the first planar edge region and the second planar edge region.

14. The shear wall panel system of claim 1, wherein at least one aperture is disposed through the active element.

15. The shear wall panel system of claim 1, wherein the second planar edge region is also fastened to the second stud.

16. A building including the shear wall panel system of any one of claims 1 to 15.

17. A shear wall panel system, comprising:
two studs, a first stud on an opposing edge of the system from a second stud;
a top stud joining the first stud and the second stud at a first edge of the shear wall panel system;
a bottom stud joining the first stud and the second stud at a second edge of the shear wall panel system;
a planar sheet of wood-based sheathing;
an opening in the planar sheet;
a frame adjacent a peripheral edge of the opening, the frame comprising one framing member parallel to an edge of the opening; and
an active element, the active element formed from a sheet of metal,
wherein the active element, when viewed in cross-section, includes a first planar edge region and a second planar edge region separated by angled surfaces, the angled surfaces angled relative to the first planar edge region and the second planar edge region,
wherein a first planar edge region is fastened to the framing member and a second planar edge region is fastened by a fastener to a first edge portion of the sheet of sheathing, and
wherein a second edge portion of the sheet of sheathing is fastened to the first stud.

18. The shear wall panel system of claim 17, wherein angled surfaces of the active element form a v-shape having an apex angle, and wherein a distal edge of the angled surface forming a leg of the v-shape is joined to one of the first planar edge region and the second planar edge region.

19. The shear wall panel system of claim 18, wherein the active element has at least two portions, the first portion at a first location proximal to the top stud and the second portion at a second location distal from the top stud, wherein a first horizontal component of shear on the force resistant building system increases the apex angle in the first portion, and reduces the apex angle in the second portion, and wherein a second horizontal component of shear on the force resistant building system reduces the apex angle in the first portion, and increases the apex angle in the second portion, the first horizontal component of shear generally opposite in direction to the second horizontal component of shear.

20. The shear wall panel system of claim 17, wherein the first planar edge region and the second planar edge region are co-planar.

21. The shear wall panel system of claim 17, wherein the first planar edge region and the second planar edge region are parallel.

22. The shear wall panel system of claim 17, wherein angled surfaces of the active element form a truncated v-shape with a distal end of each leg of the truncated v-shape joined to one of the first planar edge region and the second planar edge region.

23. The shear wall panel system of claim 17, wherein the active element includes two pairs of angled surfaces between the first planar edge region and the second planar edge region, a first pair of angled surfaces oriented in parallel relationship to a second pair of angled surfaces.

24. The shear wall panel system of claim 23, wherein the active element includes a spacer element positioned between the two pairs of angled surfaces.

25. The shear wall panel system of claim 23, wherein the spacer element has a surface that is coplanar with the first planar edge region and the second planar edge region or that is in a plane parallel to the first planar edge region and the second planar edge region.

26. The shear wall panel system of claim 17, wherein the active element has a force versus deflection property under at least one cyclic load that includes an elastic region and a plastic region, and wherein, in the plastic region, deflection increases more per unit load than in the elastic region as load increases.

27. The shear wall panel system of claim 17, comprising:
a second active element, the second active element formed from a sheet of metal,
wherein the second active element, when viewed in cross-section, includes a first planar edge region and a second planar edge region separated by angled surfaces, the angled surfaces angled relative to the first planar edge region and the second planar edge region, and
wherein a first planar edge region of the second active element is fastened to a second framing member and a second planar edge region of the second active element is fastened by a fastener to the first edge portion of the sheet of sheathing.

28. The shear wall panel system of claim 17, wherein angled surfaces of the active element form a v-shape with a distal end of each leg of the v-shape joined to one of the first planar edge region and the second planar edge region.

29. The shear wall panel system of claim 28, wherein the v-shape is non-symmetrical about a bisector of the an apex of the v-shape.

30. The shear wall panel system of claim 17, wherein angled surfaces of the active element form a truncated v-shape with a distal end of each leg of the truncated v-shape joined to one of the first planar edge region and the second planar edge region.

31. The shear wall panel system of claim 17, wherein at least one aperture is disposed through the active element.

32. The shear wall panel system of claim 17, wherein the opening in the planar sheet is sized for a window or a door.

33. The shear wall panel system of claim 17, wherein the opening in the planar sheet is sized for a passageway or doorway.

34. The shear wall panel system of claim 17, wherein the second planar edge region is also fastened to the first stud.

35. The shear wall panel system of claim 17, wherein the second planar edge region is also fastened to the second stud.

36. A building including the shear wall panel system of any one of claims 17 to 35.

37. A shear wall panel system, comprising:
two studs, a first stud on an opposing edge of the system from a second stud;
a top stud joining the first stud and the second stud at a first edge of the shear wall panel system;
a bottom stud joining the first stud and the second stud at a second edge of the shear wall panel system;
a planar sheet of metal sheathing;
an opening in the planar sheet;
a frame adjacent a peripheral edge of the opening, the frame comprising one framing member parallel to an edge of the opening; and
an active element, the active element formed from a sheet of metal,
wherein the active element, when viewed in cross-section, includes a first planar edge region and a second planar edge region separated by angled surfaces, the angled surfaces angled relative to the first planar edge region and the second planar edge region,
wherein a first planar edge region is fastened to the framing member and a second planar edge region is fastened by a fastener to a first edge portion of the sheet of sheathing, and
wherein a second edge portion of the sheet of sheathing is fastened to the first stud.

38. The shear wall panel system of claim 37, wherein angled surfaces of the active element form a v-shape having an apex angle, and
wherein a distal edge of the angled surface forming a leg of the v-shape is joined to one of the first planar edge region and the second planar edge region.

39. The shear wall panel system of claim 38, wherein the active element has at least two portions, the first portion at a first location proximal to the top stud and the second portion at a second location distal from the top stud,
wherein a first horizontal component of shear on the force resistant building system increases the apex angle in the first portion, and reduces the apex angle in the second portion, and
wherein a second horizontal component of shear on the force resistant building system reduces the apex angle in the first portion, and increases the apex angle in the second portion, the first horizontal component of shear generally opposite in direction to the second horizontal component of shear.

40. The shear wall panel system of claim 37, wherein the first planar edge region and the second planar edge region are co-planar.

41. The shear wall panel system of claim 37, wherein the first planar edge region and the second planar edge region are parallel.

42. The shear wall panel system of claim 37, wherein angled surfaces of the active element form a truncated v-shape with a distal end of each leg of the truncated v-shape joined to one of the first planar edge region and the second planar edge region.

43. The shear wall panel system of claim 37, wherein the active element includes two pairs of angled surfaces between the first planar edge region and the second planar edge region, a first pair of angled surfaces oriented in parallel relationship to a second pair of angled surfaces.

44. The shear wall panel system of claim 43, wherein the active element includes a spacer element positioned between the two pairs of angled surfaces.

45. The shear wall panel system of claim 43, wherein the spacer element has a surface that is coplanar with the first planar edge region and the second planar edge region or that is in a plane parallel to the first planar edge region and the second planar edge region.

46. The shear wall panel system of claim 37, wherein the active element has a force versus deflection property under at least one cyclic load that includes an elastic region and a plastic region, and
wherein, in the plastic region, deflection increases more per unit load than in the elastic region as load increases.

47. The shear wall panel system of claim 37, comprising:
a second active element, the second active element formed from a sheet of metal
wherein the second active element, when viewed in cross-section, includes a first planar edge region and a second planar edge region separated by angled surfaces, the angled surfaces angled relative to the first planar edge region and the second planar edge region, and
wherein a first planar edge region of the second active element is fastened to a second framing member and a second planar edge region of the second active element is fastened by a fastener to the first edge portion of the sheet of sheathing.

48. The shear wall panel system of claim 37, wherein angled surfaces of the active element form a v-shape with a distal end of each leg of the v-shape joined to one of the first planar edge region and the second planar edge region.

49. The shear wall panel system of claim 48, wherein the v-shape is non-symmetrical about a bisector of the an apex of the v-shape.

50. The shear wall panel system of claim 37, wherein angled surfaces of the active element form a truncated v-shape with a distal end of each leg of the truncated v-shape joined to one of the first planar edge region and the second planar edge region.

51. The shear wall panel system of claim 37, wherein at least one aperture is disposed through the active element.

52. The shear wall panel system of claim 37, wherein the opening in the planar sheet is sized for a window or a door.

53. The shear wall panel system of claim 37, wherein the opening in the planar sheet is sized for a passageway or doorway.

54. The shear wall panel system of claim 37, wherein the second planar edge region is also fastened to the first stud.

55. A building including the shear wall panel system of any one of claims 37 to 54.

56. A shear wall panel system, comprising:
two studs, a first stud on an opposing edge of the system from a second stud;
a top stud joining the first stud and the second stud at a first edge of the shear wall panel system;
a bottom stud joining the first stud and the second stud at a second edge of the shear wall panel system;
a planar sheet of sheathing formed from engineered composite;
an opening in the planar sheet;
a frame adjacent a peripheral edge of the opening, the frame comprising one framing member parallel to an edge of the opening; and
an active element, the active element formed from a sheet of metal,
wherein the active element, when viewed in cross-section, includes a first planar edge region and a second planar edge region separated by angled surfaces, the angled surfaces angled relative to the first planar edge region and the second planar edge region,
wherein a first planar edge region is fastened to the framing member and a second planar edge region is fastened by a fastener to a first edge portion of the sheet of sheathing, and
wherein a second edge portion of the sheet of sheathing is fastened to the first stud.

57. The shear wall panel system of claim 56, wherein angled surfaces of the active element form a v-shape having an apex angle, and
wherein a distal edge of the angled surface forming a leg of the v-shape is joined to one of the first planar edge region and the second planar edge region.

58. The shear wall panel system of claim 57, wherein the active element has at least two portions, the first portion at a first location proximal to the top stud and the second portion at a second location distal from the top stud,
wherein a first horizontal component of shear on the force resistant building system increases the apex angle in the first portion, and reduces the apex angle in the second portion, and
wherein a second horizontal component of shear on the force resistant building system reduces the apex angle in the first portion, and increases the apex angle in the second portion, the first horizontal component of shear generally opposite in direction to the second horizontal component of shear.

59. The shear wall panel system of claim 56, wherein the first planar edge region and the second planar edge region are co-planar.

60. The shear wall panel system of claim 56, wherein the first planar edge region and the second planar edge region are parallel.

61. The shear wall panel system of claim 56, wherein angled surfaces of the active element form a truncated v-shape with a distal end of each leg of the truncated v-shape joined to one of the first planar edge region and the second planar edge region.

62. The shear wall panel system of claim 56, wherein the active element includes two pairs of angled surfaces between the first planar edge region and the second planar edge region, a first pair of angled surfaces oriented in parallel relationship to a second pair of angled surfaces.

63. The shear wall panel system of claim 62, wherein the active element includes a spacer element positioned between the two pairs of angled surfaces.

64. The shear wall panel system of claim 62, wherein the spacer element has a surface that is coplanar with the first planar edge region and the second planar edge region or that is in a plane parallel to the first planar edge region and the second planar edge region.

65. The shear wall panel system of claim 56, wherein the active element has a force versus deflection property under at least one cyclic load that includes an elastic region and a plastic region, and
wherein, in the plastic region, deflection increases more per unit load than in the elastic region as load increases.

66. The shear wall panel system of claim 56, comprising:
a second active element, the second active element formed from a sheet of metal,
wherein the second active element, when viewed in cross-section, includes a first planar edge region and a second planar edge region separated by angled surfaces, the angled surfaces angled relative to the first planar edge region and the second planar edge region, and
wherein a first planar edge region of the second active element is fastened to a second framing member and a second planar edge region of the second active element is fastened by a fastener to the first edge portion of the sheet of sheathing.

67. The shear wall panel system of claim 56, wherein angled surfaces of the active element form a v-shape with a distal end of each leg of the v-shape joined to one of the first planar edge region and the second planar edge region.

68. The shear wall panel system of claim 67, wherein the v-shape is non-symmetrical about a bisector of the an apex of the v-shape.

69. The shear wall panel system of claim 56, wherein angled surfaces of the active element form a truncated v-shape with a distal end of each leg of the truncated v-shape joined to one of the first planar edge region and the second planar edge region.

70. The shear wall panel system of claim 56, wherein at least one aperture is disposed through the active element.

71. The shear wall panel system of claim 56, wherein the opening in the planar sheet is sized for a window or a door.

72. The shear wall panel system of claim 56, wherein the opening in the planar sheet is sized for a passageway or doorway.

73. The shear wall panel system of claim 56, wherein the second planar edge region is also fastened to the first stud.

74. A building including the shear wall panel system of any one of claims 56 to 73.

* * * * *